United States Patent [19]

Capobianco et al.

[11] Patent Number: 4,705,673
[45] Date of Patent: Nov. 10, 1987

[54] MIXED SOLVENT SYSTEM FOR TREATING ACIDIC GAS

[75] Inventors: Paul J. Capobianco, Brooklyn; Kenneth F. Butwell, Newburgh, both of N.Y.; Edward J. Kossakowski, North Brunswick, N.J.

[73] Assignee: Union Carbide Corporation, Danbury, Conn.

[21] Appl. No.: 854,506

[22] Filed: Apr. 22, 1986

Related U.S. Application Data

[63] Continuation of Ser. No. 659,443, Oct. 10, 1984, abandoned.

[51] Int. Cl.$^4$ .................... C01B 17/16; C01B 31/20; C09K 3/00
[52] U.S. Cl. .................................. 423/229; 252/189; 252/190; 423/229
[58] Field of Search ............... 423/229, 226; 252/189, 252/190

[56] References Cited

U.S. PATENT DOCUMENTS

| | | | |
|---|---|---|---|
| 2,550,446 | 4/1951 | Blohm et al. | 423/229 |
| 2,649,166 | 8/1953 | Porter et al. | 183/115 |
| 3,516,793 | 6/1970 | Renault | 423/229 |
| 3,989,811 | 11/1976 | Hill | 423/229 |
| 4,100,257 | 7/1978 | Sartori et al. | 423/229 |

FOREIGN PATENT DOCUMENTS 1560905  2/1980  United Kingdom .

*Primary Examiner*—John Doll
*Assistant Examiner*—Lori S. Freeman
*Attorney, Agent, or Firm*—Henry H. Gibson

[57] ABSTRACT

This invention discloses mixtures of alkyl dialcohol amines and mono alkyl ethers of polyethylene glycols which are useful in removing acidic gases from gaseous mixtures. The solvent mixtures contain between 1.5 N and 5.0 N methyl diethanolamine (MDEA), 10 to 40 percent water and the balance is methoxytriglycol (MTG). The overall heat of reaction of the solution is typically less than 500 BTU/lb $CO_2$, and remains as a single liquid phase during normal gas scrubber operating conditions.

14 Claims, No Drawings

MIXED SOLVENT SYSTEM FOR TREATING ACIDIC GAS

This application is a continuation of prior U.S. application Ser. No. 659,443, filing date 10-10-84, now abandoned.

BACKGROUND OF THE INVENTION

1. Field Of The Invention

This invention relates generally to mixed solvent systems for treating various gas streams containing acid gases. More specifically this invention relates to a solvent composition for treating a gaseous mixture where the major constituents to be removed are $CO_2$ and $H_2S$. The solvent composition maintains single phase integrity under operational conditions and has a tertiary amino alcohol, a physical solvent, and water.

2. Description Of The Prior Art

Gas scrubbing systems are used to removed acidic gases including $CO_2$, $H_2S$, $SO_2$, $SO_3$, $CS_2$, HCN, COS, and sulfur derivatives of $C_1$ to $C_4$ hydrocarbons from gas streams. Gas streams, from which these acidic gases must be removed can be from many sources. The gas streams contemplated as having the most significant commercial use for this invention are gas streams from natural gas wells. The gas removed from natural gas wells is rich in methane and other combustible gases, but contains concentrations of acidic gases such as $H_2S$ and $CO_2$. Unacceptable concentrations of $H_2S$ precludes pipe line shipment of the natural gas because of environmental considerations and government regulation. High concentrations of $CO_2$ in natural gas reduce the heating value of the gas because $CO_2$ is not combustible.

The processes to scrub the gas as received from the well head fall into two basic categories. The first category involves an apparatus in which the feed gas enters and absorber tower. The feed gases enter the absorber tower at temperatures generally between 50° F. and 100° F. and at pressure of about 400 to 1200 psia where they are contacted with a liquid solvent mixture at temperatures between 20° F. and 180° F. The solvent in the absorber tower removes the acidic gases from the methane gas before the methane exits the tower. The acid gas rich solvent is then fed to a vessel or "flash tank" in which there is a reduced pressure of about 80 to 600 psia. In this second vessel the acid gas rich solvent "flashes" and the acid gases are liberated into a gas phase. Residual methane gas is removed from the vessel and can be used to power the system. The acid gas rich solvent is then fed to a second vessel or flash tank of reduced pressure of a slight vacuum to about 20 psia. In this second flash tank the acid gas concentration in the solvent is reduced or removed completely and the "regenerated" solvent is fed back to the absorber tower. Gas scrubbing systems using this arrangement are generally referred to as "pressure swing processes".

The second category of scrubber systems can be identified as conventional systems for removing acid gases from gas streams. These systems involve an absorber tower which is at a high pressure and a low temperature. The feed gas enters this absorber tower and is contacted with a solvent. The acid gases are removed from the primary gas, for example methane, and the primary gas or methane is removed from the absorber tower. The acid gas rich solvent passes through a heat exchanger where the heat from the hot, regenerated solvent is recovered. It then enters a stripper column, which is at a high temperature and a low pressure. The acid gases are removed or "stripped" from the solvent and the solvent is then cooled and recycled back to the absorber tower. A conventional system can use the same solvents as a pressure swing system. The disadvantage with using a conventional system is that the system requires more energy. The solvent mixture in the stripper column of a conventional system must be heated to its boiling point. In contrast the solvent mixture of a pressure swing system is generally not heated.

Gas scrubbing systems which remove acidic gases from a gas stream, but are not concerned with the treatment of natural gas from a well head, can include synthesis gas operations. In these operations a hydrocarbon feed stock is heated in the presence of water over a catalyst in a vessel commonly referred to as a reformer. The resulting gas stream contains mainly CO, $CO_2$, and $H_2$. In the case of ammonia production this gas stream would be mixed with normal air in proportion so as to obtain a ratio of hydrogen and nitrogen suitable for ammonia production. The $CO_2$ still present in the gas stream can be removed by a scrubbing system containing a solvent as used in the systems for removing acid gas from natural gas well heads.

There are three general categories for solvents used in systems as discussed above. The first category is generally referred to as an aqueous amine solvent where a relatively concentrated amine solution is used for the absorption of acid gases. The second category is generally referred to as an aqueous base scrubbing solvent. In this category the solvent only contains a small amount of an amine as an activator. The third category is generally referred to as a nonaqueous solvent. This solvent contains water as a minor constituent, for example, usually less than 20% of the total concentration of the final solvent mixture. The present invention relates to the third category of gas scrubbing solvents.

There are numerous examples of nonaqueous solvents. In general, these solvents contain an amine compound, a physical solvent, and water. The solvents present in the prior art do not allow for efficient gas scrubbing operations for one or more of the following reasons. Many of the solvents separate into two distinct liquid phases at pressures, temperatures, or gas concentrations that can be found in normal operations of scrubbing systems. Some solvents in the prior art do not allow for efficient operations because they lack the proper selectivity for $CO_2$ over $CH_4$. The most significant factor which leads to inefficiency in scrubbing systems occurs when a solvent has too high of a heat of reaction or a poor "working capacity".

In references concerning solvents used in gas scrubbing systems, working capacity can be defined in one of two ways. In a pressure swing system the "effective working capacity" of the solvent is defined as the difference between the concentration of acid gases in solution at equilibrium with the feed gas and the concentration of acid gases in solution at equilibrium with the flash gases generated during an adiabatic flash of the loaded solvent to a reasonable pressure of less than 20 psia. In conventional systems the working capacity can be defined as the difference between the concentration of acid gases in solution in equilibrium with the incoming feed gas and the concentration of acid gases in solution at stripper conditions of high temperatures. A solvent having a high working capacity as measured in a pressure swing system is desirable because of the overall energy efficiency that a pressure swing system has when compared to the conventional system. The solvent mixtures according to this reference encounter difficulties with phase separation under normal operating conditions, have too high of a heat of reaction for efficient gas scrubbing, and/or have too low an effective working capacity.

Solvents that use tertiary amines in combination with physical solvents with and without rate promoting additives have been found to be efficient in acid gas scrubbing processes. In particular, U.S. Pat. No. 4,100,257 describes the use of a solvent mixture for treating acidic gaseous mixtures consisting of a sterically hindered amine, a tertiary amino alcohol, and a physical solvent. This reference states that the sterically hindered amine, due to its unstable carbamate, increases the working capacity of the solvent mixture. The definition of working capacity used in this reference is the difference between the concentration of acid gases in solution in equilibrium with the incoming feed gas and the concentration of acid gases in solution in a stripper column at an elevated temperature. This reference fails to appreciate that it is not enough to increase the solubility of acid gases in a solvent to make a process employing that solvent more energy efficient. Those solvent mixtures do not regenerate on pressure reduction alone. A solvent which is truly more energy efficient must possess two key qualities, which are a high effective working capacity and a low heat of reaction.

The concept of utilizing a solvent with a high working capacity and a low heat of reaction to absorb acid gases in a cyclic process, where the majority of solvent regeneration is achieved by pressure swing alone, is not novel. U.S. Pat. No. 2,649,166 discusses such a process utilizing dialkyl ethers of polyethylene glycol as the solvent. This reference discusses a class of solvents which are known as "physical solvents". For nearly all commercially important feed gas conditions, physical solvents must operate well below ambient temperature because of the relatively poor solubility that these solvents have for acid gases at high temperatures. This requires the use of refrigeration compressors and extensive insulation to minimize heat leaks in the process. Further, for those cases where low acid gas specifications must be met these solvents often must be regenerated through the use of an external heat source. This carries a high penalty in energy efficiency, because a large portion of this heat must later be removed by the refrigeration unit. Another draw back of physical solvents is that a substantial amount of product gas is absorbed along with the acid gases. This requires additional capital and operating expenses to recover the absorber product.

British Pat. No. 1,560,905 discusses the use of an absorption rate promoted methyldiethanolamine (MDEA) solution in a pressure swing process. This reference discusses the process without the use a cosolvent. In this case the heat of solution of this solvent is that of MDEA alone. Further, the position and shape of MDEA's solubility curves requires a gas scrubbing system according to this invention to operate at elevated temperatures which reduces the absorption capacity of the solvent and causes substantial quantities of water vapor to be liberated during flash regeneration. The liberation of water vapor represents a loss of heat from the process to the surroundings which must than be replaced by an external heat input.

British Pat. No. 1,560,905 also discusses the use of an absorbtion rate promoted MDEA solution in combination with physical solvents. It is stated that the combined concentration of the preferred promotor, piperazine, and physical solvent must be kept relatively small if the formation of piperazine carbamate is to be avoided. It is stated that at least 60 percent by weight of water must be present to prevent the precipitation of the carbamate. At this water concentration no significant quantity of "physically" dissolved carbon dioxide can be in solution.

It is desirable to operate a pressure swing process utilizing a solvent which has a high capacity for acid gases at near ambient temperatures, thereby eliminating the need for refrigeration compressors and extensive insulation. Adjustments for solvent temperature changes caused by heat leaks in or out of the system can then be accomplished by conventional means. Further, solvent regeneration through the use of an external heat source would no longer carry a high penalty since this heat would not have to be removed by refrigeration units.

It is an object of this invention to provide a solvent mixture having a tertiary amino alcohol, a physical solvent, and water that has (1) a high working capacity, (2) a single liquid phase at all operating conditions, (3) a comparatively low heat of reaction, (4) a high selectivity of $CO_2$ over $CH_4$, and (5) a viscosity that allows the solvent to be used in gas scrubbers.

BRIEF DESCRIPTION OF THE INVENTION

This invention is a solvent mixture for use in acid gas scrubbing systems having a tertiary amino alcohol, with at least two hydroxyl bearing alkyl groups attached to a central nitrogen atom. This solvent mixture contains a physical solvent and water and remains in a single liquid phase under normal operating conditions for acid gas scrubbers. The vapor-liquid equilibrium curve of the solvent mixture is such that at least 60% of the absorbed acid gases are liberated in a pressure swing process where absorber tower pressures in excess of 400 psia are reduced in a flash tank to pressures less than 20 psia at temperatures between 30° and 70° C. The solvent mixture has a heat of reaction of less than 500 BTU/lb. of $CO_2$ absorbed.

The tertiary amino alcohol contains at least two hydroxyl bearing alkyl groups attached to a central nitrogen atom with the following general formula:

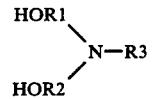

where:
R1 and R2 are alkylene groups of 2 to 4 carbon atoms, R3 is a member selected from a group consisting of an alkyl of 1 to 4 carbon atoms and an alkylene of 2 to 4 carbon atoms which contains an hydroxyl group.

In the preferred embodiment of the physical solvent is a member selected from a group consisting of a compound and a mixture of compounds having a mono alkyl ether of a polyethylene glycol with a general formula:

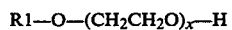

where:

R1 is an alkyl group of 1 to 4 carbon atoms.

x is an integer from 2 to 5.

DETAILED DESCRIPTION OF THE INVENTION

This invention relates to a solvent mixture, and a process using that solvent mixture, having a tertiary amino alcohol, a physical solvent, and water. The solvent mixture is for the purpose of treating a normally gaseous mixture where the major constituents to be removed are $CO_2$ and $H_2S$. The particular mixture employed exists as a single liquid phase under all normal operating conditions. Normal process or operating conditions include pressure, temperature, and the acid gas concentration in solution in the solvent mixture. Typically, normal operating pressures are in excess of 400 psia and often in excess of 1200 psia. Temperatures encountered are usually between about 20° C. and the solvent mixture's boiling point. Acid gas concentrations encountered in feed gases are usually about 2 mole percent to about 50 mole percent of the total feed gas mixture. The vapor-liquid equilibrium curve of the solution must be positioned and shaped such that at least 60% of the absorbed acid gases are liberated on pressure reduction alone from operating pressures in excess of 400 pounds per square inch absolute (psia) to less than 20 psia with no external heat input at a temperature between 30 and 70 degrees centigrade. The overall heat of reaction of the absorbed acid gases is not to exceed 500 BTU/lb $CO_2$ absorbed.

In the preferred embodiment the solvent mixture has a selectivity for $CO_2$ versus $CH_4$ of at least 100 to 1. The viscosity of the solution at the absorber temperature is less than 15 centipoise and preferably between 1 and 10 centipoise. The tertiary amino alcohols used contain at least two hydroxyl bearing alkyl groups attached to a central nitrogen atom and has the general formula:

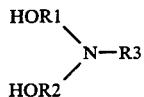

where:

R1 and R2 are alkyl groups of 2 to 4 carbon atoms,
R3 is a member selected from a group consisting of an alkyl of 1 to 4 carbon atoms and an alkylene of 2 to 4 carbon atoms which contains a hydroxyl group.

Examples of acceptable compounds within this general structure include methyldiethanolamine (MDEA), ethyldiethanolamine, triethanolamine, methylethanolpropanolamine, ethylethanolpropanolamine, and methyldipropanolamine.

The solvent mixture contains a solvent which has predominately a physical solvent characteristic. Various physical solvents can potentially work with the solvent mixture of this invention. The physical solvent in the preferred embodiment is selected from a group consisting of a compound or a mixture of compounds having a mono alkyl ether of a polyethylene glycol with a general formula:

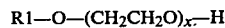

where:

R1 can be an alkyl group of 1 to 4 carbon atoms.

x is an integer from 2 to 5.

Examples of acceptable compounds within this general structure include methoxytriglycol (MTG), methoxytetraglycol, butoxytriglycol, ethoxytriglycol, methoxydiglycol, and butoxydiglycol.

Various compounds according to the general formulas for the tertiary amino alcohols and physical solvents are commercially available as separate reagents. Other compounds according to these general structures, whether or not commercially available, can be used with this invention. The effective concentration ratios of such compounds are generally similar or the same as those disclosed in the tables and examples detailed below.

The "effective working capacity" of the solvent mixture is defined as the difference between the concentration of acid gases in solution at equilibrium with the feed gas and the concentration of acid gases in solution at equilibrium with the flash gases generated during an adiabatic flash of the loaded or acid gas containing solvent to a pressure of a slight vacuum to 20 psia. The effective working capacity of solvent mixtures according to this invention reduce the solvent circulation rate required to treat a particular feed gas. This reduces the energy requirements associated with heating the solvent mixture up to its boiling temperature. A solvent mixture according to this invention can be substantially regenerated by pressure swing alone and requires only a small portion of the solvent mixture to be thermally regenerated. In this manner the greater effective working capacities of the present invention allow for a more energy efficient process.

The "effective working capacity" of the present invention is illustrated in Table I. As explained above the effective working capacity is meant as a measure of the solvent's ability to be regenerated by pressure swing alone. In all cases, the combination of MDEA and methoxytriglycol MTG yields a solvent with excellent effective working capacities.

TABLE I

| Solution (Remainder is Water) | EFFECTIVE WORKING CAPACITY Net Solution Carbon Dioxide Capacity between 4 and 100 psia partial pressure Temperature = 40 deg C. (weight percent ± 0.2) |
|---|---|
| 22 wt % or 1.8 N MDEA + 58 wt % MTG | 5.0 |
| 35 wt % or 2.94 N MDEA + 35 wt % MTG | 8.4 |
| 40 wt % or 3.3 N MDEA + 40 wt % MTG | 8.5 |
| 3.0 N DIPA[1] + 40 wt % Sulfolane[2] | 3.0 |
| 1.8 N DIPA + 68.7 wt % Selexol ® | 2.5 |
| 98 wt % Selexol ® | 2.7 |

TABLE I-continued
EFFECTIVE WORKING CAPACITY

| Solution (Remainder is Water) | Net Solution Carbon Dioxide Capacity between 4 and 100 psia partial pressure Temperature = 40 deg C. (weight percent ± 0.2) |
|---|---|
| 5.0 N Monoethanolamine | 2.4 |

[1] DIPA is diisopropylamine.
[2] This mixture is sold as Sulfinol ® by The Shell Oil Company, Houston, Texas 77201.

In addition to possessing greater effective working capacities, solvent mixtures of the present invention possess a low heat of reaction or solution for the absorbed acid gases. This is especially important because as the circulation rate is reduced the temperature of the solvent exiting the absorber tower is increased in direct proportion and thus, reduces the capacity of the solvent. The "effective working capacity" of a solvent is a function of both the solubility curves of the gases for the solvent mixture and the heat of solution of the absorption reaction.

The heat of reaction or solution of the solvent mixture is strongly dependent on the particular tertiary amino alcohol selected. The heats of solution for several tertiary amino alcohols are shown in Table II.

TABLE II

| AMINE | HEAT OF REACTION (BTU/lb $CO_2$) |
|---|---|
| Diethylethanolamine (DEEA) | 800 |
| Dimethylethanolamine (DMEA) | 800 |
| Methyl diethanolamine (MDEA) | 550 |
| Triethanolamine (TEA) | 500 |

The data in Table II illustrates that the substituent groups on the central nitrogen atom have a significant effect on the heat of reaction of the absorption reaction. The preferred embodiment of the present invention uses MDEA in the solvent mixture.

The heats of solution of several amine physical solvent combinations are listed in Table III.

TABLE III
HEATS OF REACTION

| Solution | Heat of Solution (BTU/lb carbon dioxide) |
|---|---|
| 1.8 N MDEA + 58 wt % MTG | 330 |
| 3.3 N MDEA + 40 wt % MTG | 360 |
| 3.0 N DIPA + 40 wt % Sulfolane | 690 |
| 3.0 N DIPA + 50 wt % Selexol ® | 1040 |
| 5.0 N Monoethanolamine | 850 |
| 98 wt % Selexol ® | 201 |

As shown, the present invention has a significantly lower heat of reaction of between about 330 and about 360 BTU/lb. $CO_2$ absorbed when compared to other combinations of physical solvents which do not form two phases.

The choice of the physical and chemical solvent of the solvent mixture is critical with respect to its liquid phase stability. Experiments with several tertiary amines in combination with two commercially used physical solvents: cyclotetramethylenesulfone (Sulfolane) and dimethyl ethers of polyethylene glycol (Selexol®) Sold by Norton Chemical Process Products, Box 350, Akron, Ohio 44309, showed that in every case two liquid phases formed at liquid phase carbon dioxide concentrations greater than five weight percent. Conversely, no phase separation occurred when the same test was performed using methoxytriglycol (MTG) as the physical solvent. The various combinations studied are listed in Table IV.

TABLE IV
PHASE SEPARATION STUDIES

| SOLUTIONS (Remainder is water) | PHASE SEPARATION OBSERVED (YES/NO) |
|---|---|
| 22 wt % or 1.8 N MDEA + 58 wt % MTG | NO |
| 35 wt % or 2.94 N MDEA + 35 wt % MTG | NO |
| 40 wt % or 3.3 N MDEA + 40 wt % MTG | NO |
| 1.8 N MDEA + 58 wt % Sulfolane | YES |
| 1.8 N MDEA + 58 wt % DMTG[1] | YES |
| 1.8 N DEE2A + 58 wt % Selexol ® | YES | where: DEE2A has the structure $(CH_3CH_2)_2N-CH_2CH_2-O-CH_2CH_2OH$
[1] DMTG is Dimethoxytri Glycol.

It is believed that the terminal hydroxyl group of MTG provides phase stability through hydrogen bonding. Methoxytriglycol (MTG) was chosen for testing as a cosolvent because of its favorable solution viscosity and cost of manufacturing.

To determine which factors influence the carbon dioxide solubility in MTG-like solvents, a family of compounds were studied and the results are summarized in Table V. As Table V illustrates, carbon dioxide solubility is maximized by increasing the number of ether linkages, eliminating hydroxyl groups, and the use of products having pure solvent compounds as opposed to products having a distribution of compounds by molecular weight. Table V as follows:

TABLE V

| COMPOUND NAME | STRUCTURE | VISCOSITY (CP) (40 deg C.) | HENRY'S CONSTANT (psia/wt % $CO_2$) |
|---|---|---|---|
| Ethylene Glycol | $OHCH_2CH_2OH$ | 11.0 | 104.7 |
| Diethylene Glycol | $OH(CH_2CH_2O)_2H$ | 18.0 | 68.3 |
| Triethylene Glycol | $OH(CH_2CH_2O)_3H$ | 22.0 | 63.2 |
| Methoxytri Glycol | $CH_3O(CH_2CH_2O)_3H$ | 4.03 | 36.6 |
| Dimethoxytri Glycol | $CH_3O(CH_2CH_2O)_3CH_3$ | — | 21.6 |
| Monomethyl polyglycol | $CH_3O(CH_2CH_2O)_xCH_3$ average X = 7 | — | 39.3 |
| Selexol ® | $CH_3O(CH_2CH_2O)_xCH_3$ average X = 4 to 6 | 4.0 | 28.5 |

Since the number of ether linkages and terminal hydroxyl groups seem to be the controlling factors in determining carbon dioxide solubility in a physical solvent, modifying the terminal alkyl group is not expected to have a significant effect on carbon dioxide solubility.

Low product solubility is also an important feature of an acid gas scrubbing solution. High product solubility is one of the major reasons physical solvents are not used extensively in natural gas treating facilities. The present invention represents a substantial improvement over typical physical solvents with respect to methane solubility while possessing only slightly greater methane solubility than conventional amine solvents. The methane solubility of a solvent mixture of MDEA and MTG according to this invention is compared in Table VI to conventional solvent mixtures.

TABLE VI

METHANE SOLUBILITY
Temperature = 30 deg C.

| Solution (Remainder is water) | Henry's Constant for methane (psia/wt % methane) |
| --- | --- |
| 3.3 N MDEA + 40 wt % MTG | 4500 |
| 3.0 N DIPA + 40 wt % Sulfolane | 1790 |
| 98 wt % Selexol ® | 1092 |
| 5.0 N Monoethanolamine | 9000 |

The present invention's capacity for absorbing hydrogen sulfide was demonstrated in equilibrium experiments conducted with a mixture of 3.3 N MDEA, 40 wt % MTG and 20 wt % water at a temperature of 40° C. At a hydrogen sulfide partial pressure of 10 psia in the vapor phase, the liquid phase contained 3.5 weight percent hydrogen sulfide.

Desirable embodiments of the solvent mixture comprise between about 1.5N or 17.9 weight percent and about 5.0N or 60 weight percent MDEA, 10 to 40 weight percent water, and the balance is MTG. In the most preferred embodiments, the solvent mixture comprises between about 1.8N or 22 weight percent and about 4.0N or 48 weight percent MDEA, 15 to 30 weight percent water, and the balance is MTG.

Other compounds that are commonly added to solvent mixtures include defoaming agents, antioxidants, and corrosion inhibitors. These compounds are commercially available and vary widely in structure and effective concentration. Usually the total of these additive compounds is less than 3% of the solvent mixture and more preferably less than 0.5% of the solvent mixture.

The preferred mode for using this invention involves contacting the solvent mixture, which is circulated in a gas scrubbing apparatus, with the acid gas containing stream in an absorber tower containing either trays or packing at a lean solvent temperature ranging from 30 to 60 degrees centigrade. Regeneration of the solvent can be accomplished by pressure reduction and or thermal regeneration. The solvent of the present invention is most effective when employed in a process that regenerates the solvent by pressure reduction alone. The solvent mixture is thus continuously circulated through the gas scrubbing system. The solvent mixture alternately is used to absorb the acid gases from a gas stream and then is regenerated to eliminate at least part of the absorbed acid gases it contains.

EXAMPLE I

The following solvent mixture is discussed in Tables I, III, and IV and represents the preferred embodiment of the invention. The ingredients are commercially available.

| Compound | wt % |
| --- | --- |
| Methyl Diethanolamine (MDEA) | 40 |
| Methoxytriglycol (MTG) | 40 |
| Water | 20 |

The ingredients are measured and mixed together at ambient temperature and pressure in a vat by conventional means. No specialized apparatus or exceptional safety precautions are required. The solvent mixture is then poured into containers or container vehicles such as trucks or rail cars for storage or shipping.

EXAMPLE II

This Example is discussed in Tables I and IV and is prepared in the same manner as that of Example I except that the following formula is used:

| Compound | wt % |
| --- | --- |
| Methyl diethanolamine (MDEA) | 35 |
| Methoxytriglycol (MTG) | 35 |
| Water | 30 |

EXAMPLE III

This Example is discussed in Tables I, III, and IV and is prepared in the same manner as that of Example I except that the following formula is used:

| Compound | wt % |
| --- | --- |
| Methyl diethanolamine (MDEA) | 22 |
| Methoxytriglycol (MTG) | 58 |
| Water | 20 |

EXAMPLE IV, V, AND VI

These examples are prepared in the same manner as that of Example I except that the following formulas are used:

| Compound | wt % |
| --- | --- |
| Methyl diethanolamine (MDEA) | 17.9 |
| Methoxytetraethylene glycol | 72.1 |
| Water | 10.0 |
| Methyl diethanolamine (MDEA) | 60 |
| Butoxytriglycol | 20 |
| Water | 20 |
| Triethanolamine (TEA) | 30 |
| Methoxytriglycol (MTG) | 30 |
| Water | 40 |

We claim:
1. A process of acid gas scrubbing comprising:
   (a) circulating in a gas scrubbing apparatus a solvent mixture having:
      (1) methyl diethanolamine;
      (2) a physical solvent which is a member selected from the group consisting of a compound, or a mixture of compounds, having a mono alkyl ether of a polyethylene glycol with a general formula:

$$R1-O-(CH_2CH_2O)_x-H$$

wherein
R1 is an alkyl group of 1 to 4 carbon atoms and

X is an integer of from 2 to 5; and (3) a quantity of water and wherein said solvent mixture:
  (i) remains in a single liquid phase under operating conditions sufficient for acid gas scrubbing.
  (ii) liberates at least 60% of absorbed acid gases in a pressure swing process wherein an absorption pressure is in excess of 400 psia and a flash pressure is less than 20 psia;
  (iii) has a heat of reaction of less than 500 BTU/lb. of $CO_2$ absorbed; and
  (iv) possesses an effective working capacity of greater than about 5 weight percent between carbon dioxide partial pressures of 4 and 100 psia at a temperature of 40° C.;

(b) contacting said solvent mixture in an absorber tower of said gas scrubbing apparatus with a gas stream containing acid gases such that said acid gases are absorbed into said solvent mixture; and (c) regenerating by a pressure swing system in said gas scrubbing apparatus said solvent mixture such that said absorbed acid gases are at least in part eliminated from said solvent mixture.

2. The process of claim 1 wherein said physical solvent is methoxytriglycol.

3. The process of claim 1 wherein said heat of reaction is between about 330 and about 360 BTU/lb. of $CO_2$ absorbed.

4. The process of claim 1 wherein said solvent mixture has a selectivity for $CO_2$ versus $CH_4$ of at least 100 to 1.

5. The process of claim 1 wherein said solvent mixture has a viscosity of less than 15 centipoise.

6. The process of claim 1 wherein said solvent mixture comprises:
methyl diethanolamine in a concentration of between 17.9 weight percent and 60 weight percent; and
water in a concentration of between 10 and 40 weight percent.

7. The process of claim 6 wherein said methyl diethanolamine is in a concentration of between 22 weight percent and 48 weight percent and said water is in a concentration of between 15 and 30 weight percent.

8. A solvent mixture for use in acid gas scrubbing systems comprising:
(a) methyl diethanolamine;
(b) methoxytriglycol; and
(c) a quantity of water and wherein said solvent mixture:
  (i) remains in a single liquid phase under operating conditions sufficient for acid gas scrubbing;
  (ii) liberates at least 60% of absorbed acid gases in a pressure swing process wherein an absorption pressure is in excess of 400 psia and a flash pressure is less than 20 psia;
  (iii) has a heat of reaction of less than 500 BTU/lb. of $CO_2$ absorbed; and
  (iv) possesses an effective working capacity of greater than about 5 weight percent between carbon dioxide partial pressures of 4 and 100 psia at a temperature of 40° C.

9. The solvent mixture according to claim 8 wherein said heat of reaction is between about 330 and about 360 BTU/lb. $CO_2$ absorbed.

10. The solvent mixture according to claim 8 wherein said solvent mixture has a selectivity for $CO_2$ versus $CH_4$ of at least 100 to 1.

11. The solvent mixture according to claim 8 wherein said solvent mixture has a viscosity of less than 15 centipoise.

12. A solvent mixture for use in acid gas scrubbing systems comprising:
methyl diethanolamine in a concentration of between 17.9 weight percent and 60 weight percent;
a methoxytriglycol; and
water in a concentration of between 10 and 40 weight percent.

13. The solvent mixture according to claim 12 wherein said methyl diethanolamine is in a concentration of between 22 weight percent and 48 weight percent and said water is in a concentration of between 15 and 30 weight percent.

14. A solvent mixture consisting essentially of between 17.9 weight percent and 60 weight percent methyl diethanolamine, a methoxytriglycol, and water.

* * * * *